(12) United States Patent
Nagai et al.

(10) Patent No.: US 6,509,747 B2
(45) Date of Patent: Jan. 21, 2003

(54) APPARATUS FOR DETECTING SEATED CONDITION

(75) Inventors: Makoto Nagai, Saitama (JP); Kouichi Kamiji, Saitama (JP); Naotaka Kumakiri, Saitama (JP); Tsutomu Fukui, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 15 days.

(21) Appl. No.: 09/789,751

(22) Filed: Feb. 22, 2001

(65) Prior Publication Data

US 2001/0026162 A1 Oct. 4, 2001

(30) Foreign Application Priority Data

Mar. 21, 2000 (JP) ........................................ 2000-078718
Mar. 27, 2000 (JP) ........................................ 2000-086934

(51) Int. Cl.$^7$ ............................................. G01R 27/26
(52) U.S. Cl. ..................................................... 324/687
(58) Field of Search ......................... 324/687; 701/45; 180/271, 273; 280/728.1, 735; 340/573.1, 667

(56) References Cited

U.S. PATENT DOCUMENTS

| | | | | |
|---|---|---|---|---|
| 5,948,031 A | * | 9/1999 | Jinno et al. | 701/45 |
| 6,158,768 A | * | 12/2000 | Steffens et al. | 280/735 |
| 6,161,070 A | * | 12/2000 | Jinno et al. | 701/45 |
| 6,208,249 B1 | * | 3/2001 | Saito et al. | 340/561 |
| 6,283,504 B1 | * | 9/2001 | Stanley et al. | 280/735 |
| 6,329,913 B1 | * | 12/2001 | Shieh et al. | 340/561 |
| 6,356,187 B2 | * | 3/2002 | Jinno et al. | 340/438 |

* cited by examiner

Primary Examiner—Christine Oda
Assistant Examiner—Etienne LeRoux
(74) Attorney, Agent, or Firm—Armstrong, Westerman & Hattori, LLP

(57) ABSTRACT

An apparatus for detecting seated condition detects whether a passenger is seated on a seat and the location of the passenger if seated. In the apparatus for detecting seated condition, antenna electrodes are provided in the inside the seat so that the electric field generates between the ground and the antenna electrodes. A detecting unit detects a first output of the electric field in a case that a passenger is not seated and a second output of the electric field in a case that a passenger is seated. A data processing unit corrects the second output based on the first output. Accordingly, the seated condition whether the passenger is seated can accurately be detected.

9 Claims, 7 Drawing Sheets

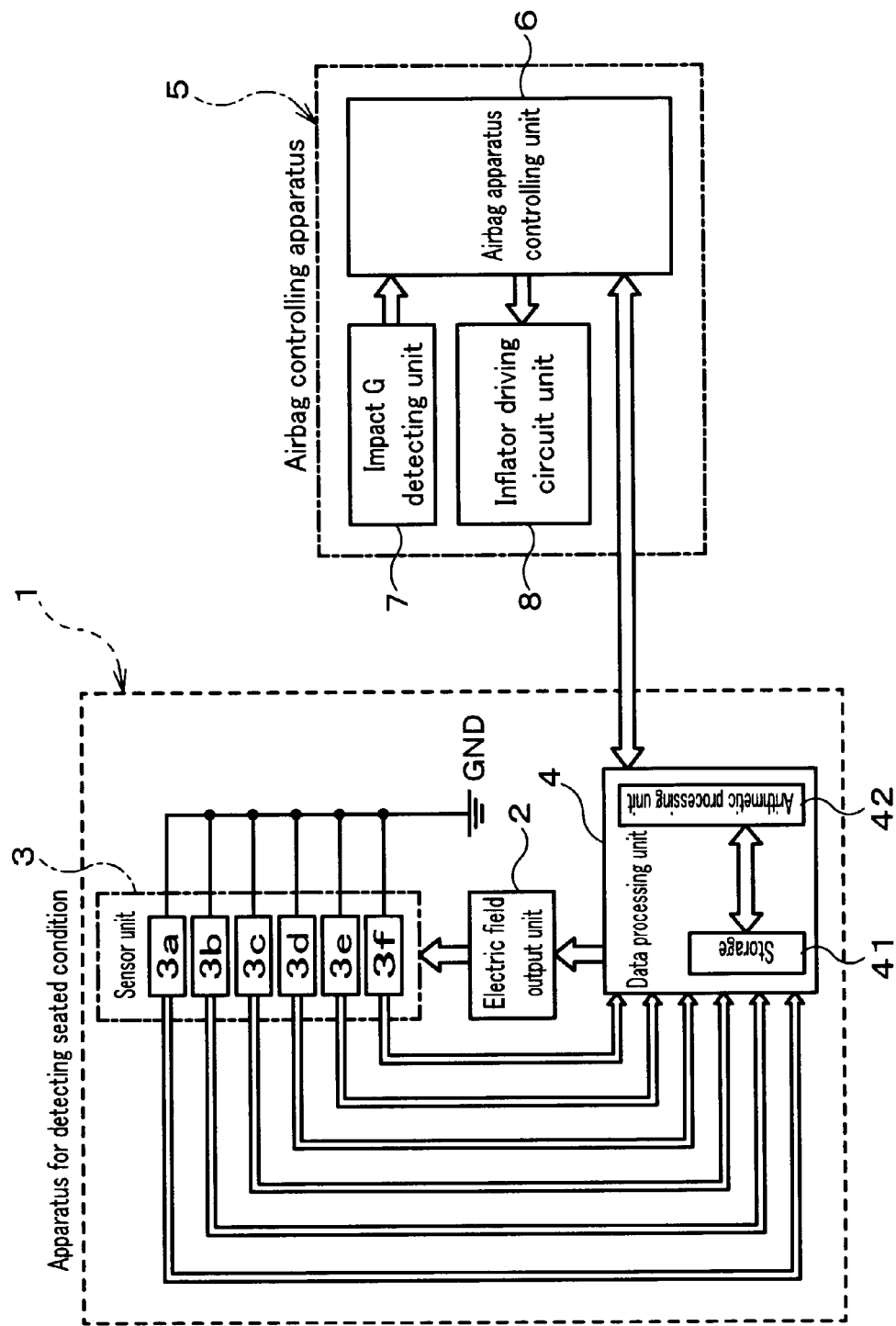

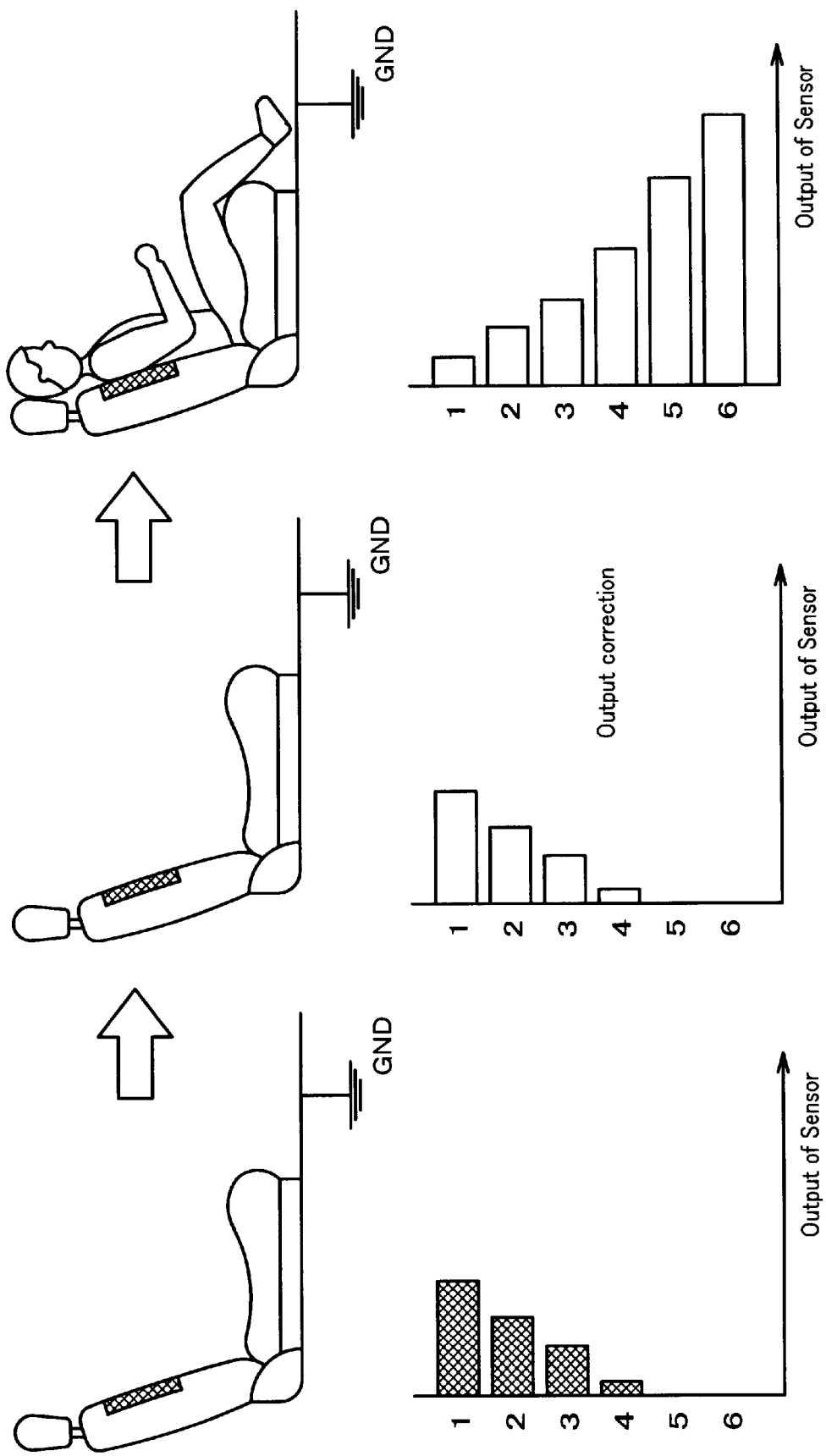

APPARATUS FOR DETECTING SEATED CONDITION

FIELD OF THE INVENTION

The present invention relates to an apparatus for detecting seated condition whether a human body is seated, and especially relates to an apparatus for detecting the seated condition utilizing an electrostatic capacity sensor.

BACKGROUND OF THE INVENTION

Conventional apparatus for detecting seated condition utilizes an electrostatic capacity sensor. The electrostatic capacity sensor is used because it is superior in the stable output among other noncontacting sensors and it can accurately measure the very fine change. Further, antenna electrodes that are probes of the electrostatic capacity sensor can be changed their shapes and made smaller, so that if the antenna electrodes are provided in the inside of the seat, a person who sits on the seat does not feel them.

The apparatus for detecting seated condition is used in an automobile. Generally, in case of emergency, an airbag inflates between passenger and a body of the automobile to reduce the impact to be received by the passenger. The airbag apparatus requires to detect the passenger's seated position accurately to control the operation of the airbag appropriately in all cases of the seated positions.

Therefore, in order to detect the seated condition of the passenger in the automobile, the antenna electrodes of the electrostatic capacity sensor are provided in the inside of the seat.

In the apparatus, the electrostatic capacity existing between the antenna electrodes and the body of the automobile is detected, and the seated condition is determined based on the detected result.

SUMMARY OF THE INVENTION

It is an object of the present invention to provide an apparatus for detecting seated condition whether a human body is seated, which can accurately detect the seated condition under any circumstances.

In order to achieve the above object, an apparatus for detecting seated condition of the present invention comprises an antenna electrode provided in the inside a seat, a power supply for supplying power for generating radio wave to the antenna electrode so that an electric field generates between the antenna electrode and a ground to detect a passenger on the seat, a detecting unit for detecting electrostatic capacity existing between the antenna electrode and the ground, and a data processing unit for determining the seated condition for the seat based on the detected electrostatic capacity. In this apparatus, the detecting unit detects a first value of the electrostatic capacity in a case that a passenger is not seated and a second value of the electrostatic capacity in a case that a passenger is seated. Then, the data processing unit corrects the second value of the electrostatic capacity based on the first value.

According to the apparatus for detecting seated condition of the present invention, the first output of the electrostatic capacity sensor in the case that the passenger is not seated is detected, and the second output of the electrostatic capacity sensor in the case that the passenger is seated is corrected based on the first output, so that the apparatus can accurately determine whether the passenger is seated under any circumstances.

Another noncontacting sensor can be provided in the apparatus for detecting seated condition. In this case, the accuracy for the detection of the passenger on the seated is further enhanced.

An apparatus for detecting seated condition of the present invention may comprise an antenna electrode provided inside a seat, a power supply for supplying power for generating radio wave to the antenna electrode so that an electric field generates between the antenna electrode and a ground to detect the passenger on the seat, a detecting unit for detecting electrostatic capacity existing between the antenna electrode and the ground, a data processing unit for determining the seated condition for the seat based on the detected electrostatic capacity, and a load sensor for detecting a load acting on the seat. In this case, the data processing unit determines the seated condition for the seat based on the detected value of the electrostatic capacity and a detected value of the load sensor. The electrostatic capacity, the weight and the center of gravity of the load detected by the load a sensor are premeasured for kinds of the seated posture, kinds of the passenger's physique and kinds of loads, and the premeasured data are stored in the data processing unit as parameters, and the data processing unit determines the seated condition for the seat by comparing the detected value of the electrostatic capacity and the detected value of the load sensor with the parameters.

According to the apparatus for detecting seated condition, it can accurately detects the seated condition for the seat, e.g., whether the adult or child is seated, whether the subject on the seat is a passenger or a baggage and whether the passenger is seated.

Because the parameters are used, the detecting speed is increased.

BRIEF DESCRIPTION OF THE DRAWINGS

FIG. 2 is a bock diagram showing the apparatus for detecting seated condition according to the first embodiment of the present invention used together with an airbag controlling apparatus.

FIG. 4 is a view for explaining the correction of the output value of the electrostatic capacity sensor of the apparatus for detecting seated condition.

DESCRIPTION OF THE PREFERRED EMBODIMENT

Figure 1:
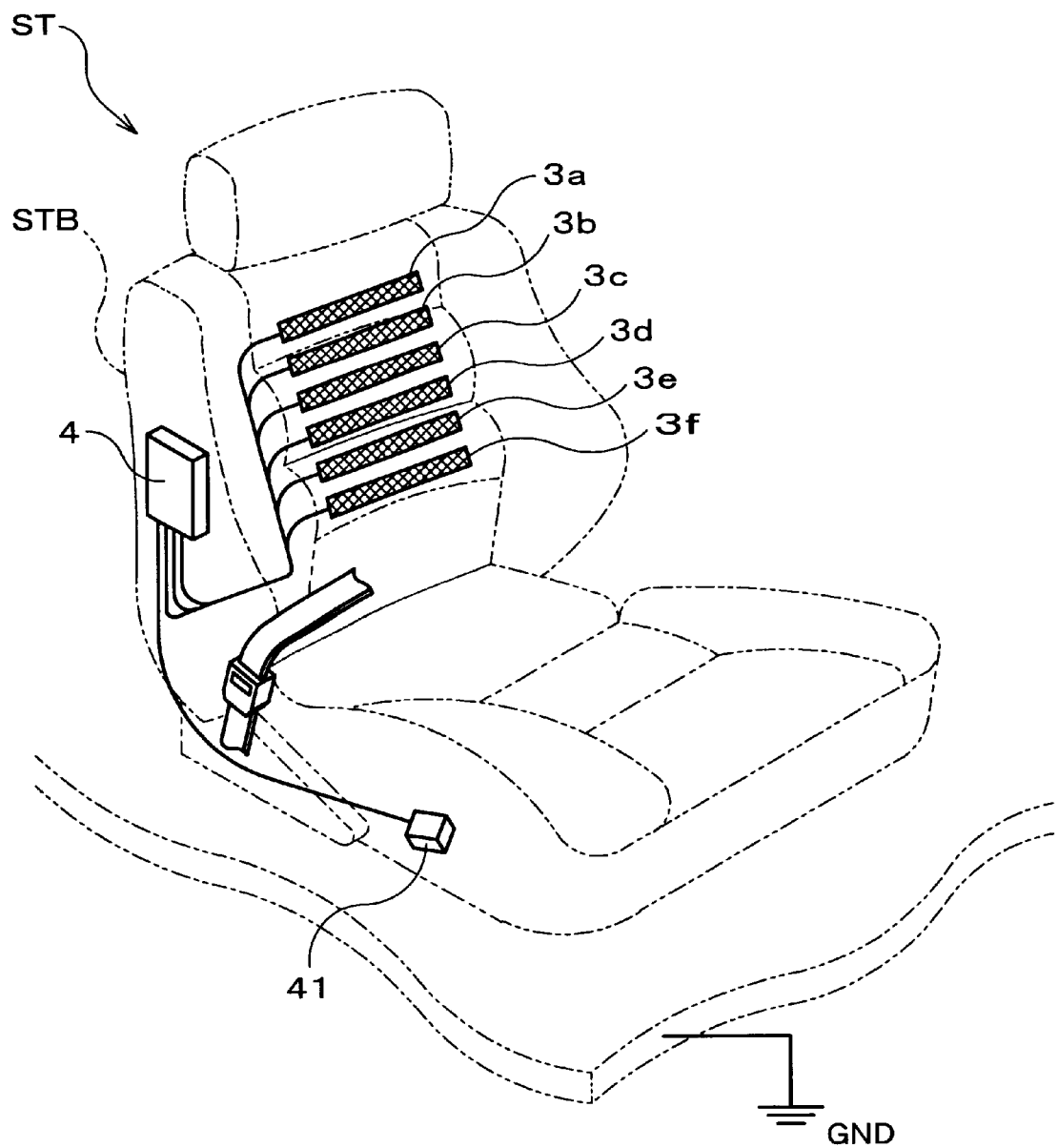
FIG. 1 is a perspective view showing an apparatus for detecting seated condition of the present invention utilized in a seat of an automobile.

The preferred embodiments of the present invention will be described hereinafter with reference to the accompanying drawings. In the following description and the drawings, the same reference numerals are used for the same components and repetitive description on the same components will be omitted.

FIG. 1 shows a seat of an automobile to which an apparatus for detecting seated condition according to the first embodiment of the present invention is adopted. FIG. 2 shows a block diagram of the apparatus for detecting seated condition used together with an airbag controlling apparatus of the automobile.

As shown in FIG. 1, six antenna electrodes 3a, 3b, 3c, 3d, 3e, 3f are provided in the inside of a back portion STB of the seat ST. As shown in FIG. 2, the apparatus for detecting seated condition 1 comprises an electric field output unit 2 for generating high-frequency power, an electrostatic capacity sensor which comprises a sensor unit 3 having six antenna electrodes 3a, 3b, 3c, 3d, 3e, 3f and a ground (floor of the automobile) GND, and a data processing unit 4 including a storage 41 and an arithmetic processing unit 42 for determining whether a passenger is seated by recording and correcting an output value (current) from the electric field output unit 2 and comparing it with a pre-input value.

The data processing unit 4 is provided at the right side of the back portion STB of the seat ST. In FIG. 1, reference numeral 41 is a transmitter for transmitting the output of the data processing apparatus 4 by the radio wave.

The airbag controlling apparatus 5 comprises an airbag apparatus controlling unit 6, an impact G detecting unit 7 and an inflator driving circuit unit 8.

The airbag apparatus controlling unit 6 includes a CPU, an I/O port, an interruption circuit and others, which are not shown.

The impact G detecting unit 7 detects the impact of the automobile with an acceleration sensor. In a case that the detected impact is stronger than a predetermined value, it outputs an electric signal to the airbag apparatus controlling unit 6.

In thus constructed airbag controlling apparatus 5, the airbag apparatus controlling unit 6 inputs the electric output signal of the data processing unit 4 and the electric output signal of the impact G detecting unit 7. In a case that these electric output signals exceed each predetermined value, the airbag apparatus controlling unit 6 outputs an electric signal to the inflator driving circuit unit 8 to drive. Then, when the inflator driving circuit unit 8 inputs the electric output signal of the airbag apparatus controlling unit 6, the inflator operates to generate nitrogen gas. Then, at a driver's seat, the airbag inflates instantly, e.g., in 0.03 second.

Figure 3A:
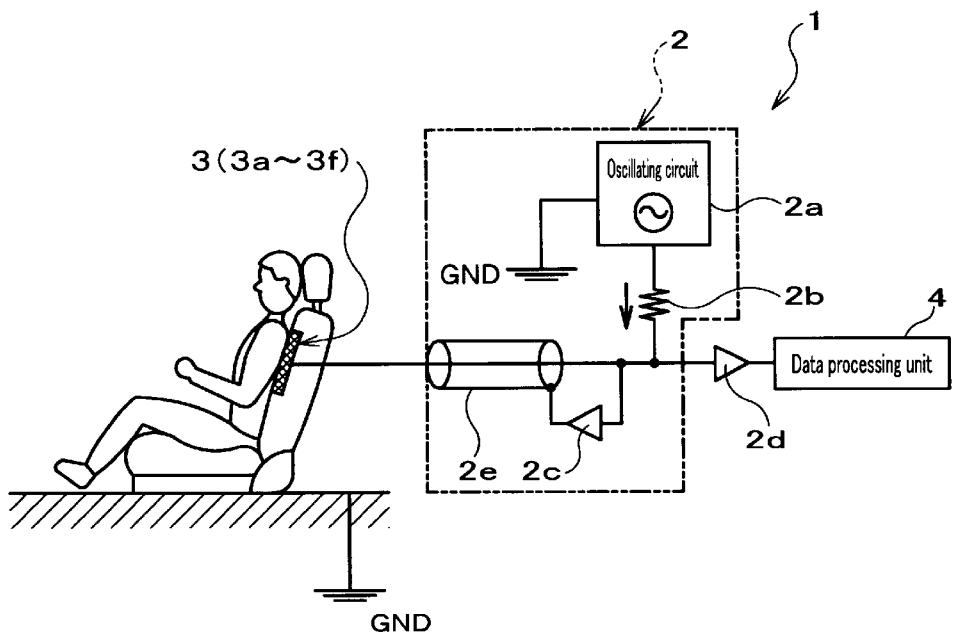
FIG. 3A is a schematic view showing the configuration of the apparatus for detecting'seated condition.

FIG. 3A is a schematic view showing the apparatus for detecting seated condition. As shown in FIG. 3A, the electric field output unit 2 comprises a high-frequency oscillating circuit 2a one end of which is grounded, a current monitor resistor 2b, a shield line 2e connected to antenna electrode 3a–3f at the output side of the current monitor resistor 2b and an amplifier 2c for supplying a required current to the shield line 2e.

The high-frequency oscillating circuit 2a is grounded at one end and connected to one end of the monitor resistor 2b at the other end. The other end of the current monitor resistor 2b is connected to the antenna electrodes 3a–3f over the shield line 2e and also to the data processing unit 4 over an amplifier 2d.

Further, the amplifier 2c diverges the current flowing from the current monitor resistor 2b, amplifies the diverged current and supplies it to the shield line 2e as a current for shielding.

This is to shield the electric wires so that the radio radiation power applied to the antenna electrodes 3a–3f are not influenced by the outside magnetic field and other causes.

The sensor unit 3 having six antenna electrodes 3a–3f for radiating the high-frequency wave (sine wave) generated by the electric field output unit 2 and the ground (floor of the body of the automobile) GND constitute the electrostatic capacity sensor. As shown in FIG. 1, six antenna electrodes 3a–3f are placed in the inside of the back portion STB of the seat ST at the central portion. The antenna electrodes 3a–3f receive the radio radiation power supplied from the electric field output unit 2 and radiate it to the air.

The data processing unit 4 is to record, correct and process the output data in both cases of the passenger being seated and being not seated on the seat ST. In the case of processing the recorded data, as shown in FIG. 4, the data processing unit 4 processes the recorded data by using the sensed output value (normally no output) in the case of the passenger being not seated as a reference value (blank value) and correcting the sensed output value in the case of the passenger being seated.

After the correction, when it is determined that the passenger is seated, the data processing unit 4 outputs the electrical signal to the airbag apparatus controlling unit 6 of the airbag controlling apparatus 5 (see FIG. 2). On the other hand, when it is determined that the passenger is not seated, the unit 4 does not output the electrical signal.

Next, the operation of thus constructed apparatus for detecting seated condition 1 will be described referring to FIGS. 3A, 3B.

When the high-frequency oscillating circuit 2a of the electrical field output unit 2 oscillates the sine wave, e.g., of 120 kHz, the output current I is converted into the voltage by the current monitor resistor 2b.

Figure 3B:
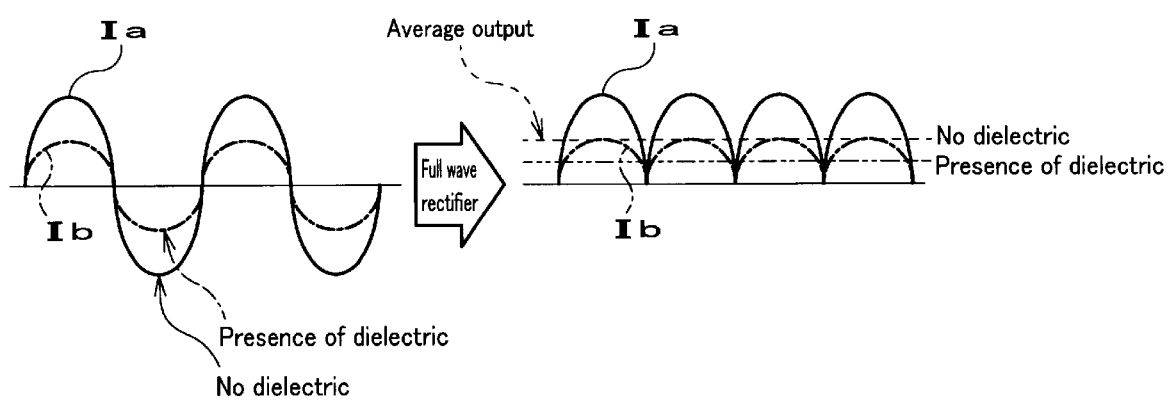
FIG. 3B is a graph showing the analysis of output data of the apparatus for detecting seated condition.

In the case that the passenger is not seated, as shown in FIG. 3B, the output current Ia to the data processing unit 4, which generates in response to the radio wave radiated from the plural antenna electrodes 3a–3f, becomes a large value corresponding to the dielectric constant of air and the distance between the antenna electrodes 3a–3f and the ground GND. This is because the current hardly flows into the outside of the electric field output unit 2.

In result, the voltage difference between the ends of the current monitor resistor 2b becomes large and the output voltage of the amplifier 2d also becomes large.

On the other hand, in the case that the passenger who has a large dielectric constant compared to the air is seated on the seat, the impedance between the antenna electrodes 3a–3f and the ground GND is changed corresponding to the area that the passenger faces the antenna electrodes 3a–3f and the distance between the antenna electrodes 3a–3f and the passenger. Then, the large current flows from the electric field output unit 2 to the outside of the system through the human body and the small current Ib flows to the data processing unit 4.

In result, the voltage difference between the ends of the current monitor resistor 2b becomes small and the output voltage of the amplifier 2d also becomes small.

Accordingly, the condition whether the passenger is seated can be detected by analyzing the output patterns from six antenna electrodes 3a–3f in the case of the passenger seated and in the case of the passenger not seated.

One of the methods for analyzing the output patterns is that as shown in FIG. 3B, output currents (or voltage) in both cases of the passenger seated and the passenger not seated is full-wave rectified to obtain the average output value. The average output value is compared with a predetermined value to determine whether the passenger is seated.

Figure 5:
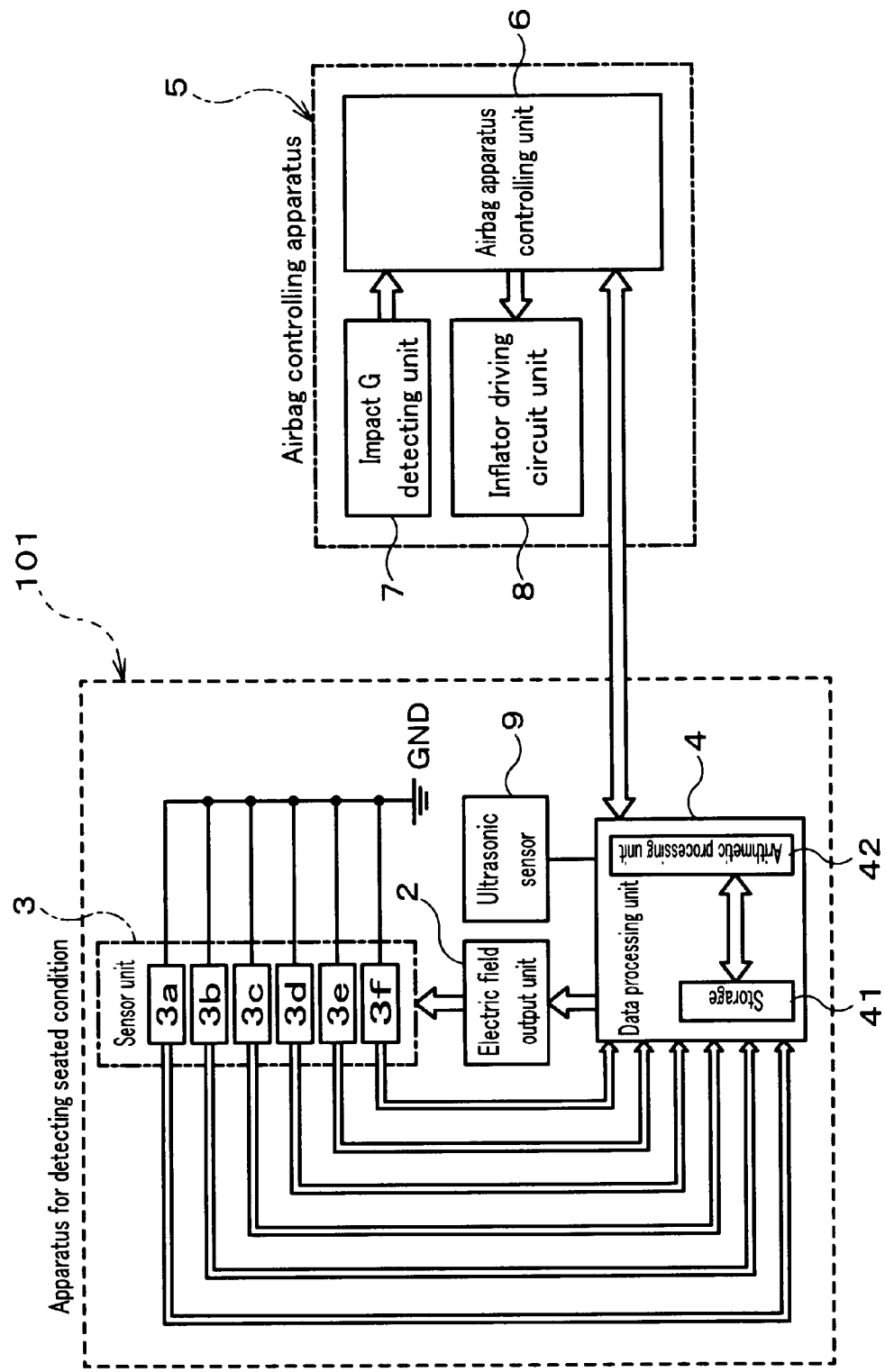
FIG. 5 is a block diagram showing the apparatus for detecting seated condition according to the second embodiment of the present invention used together with the airbag controlling apparatus.

Next, the second embodiment of the apparatus for detecting seated condition applied to the airbag controlling apparatus will be described, referring to FIG. 5. The difference between the first embodiment and the second embodiment is the provision of the noncontacting passenger detecting sensor other than the electrostatic capacity sensor. Therefore, the configuration and the operation of the noncontacting sensor used together with the electrostatic capacity sensor will be described only and other explanation will be omitted.

The noncontacting sensor is an ultrasonic sensor 9 which is connected to the data processing unit 4. The ultrasonic sensor 9 is preferably used because it has a wide range of measuring distance and the measurement is not influenced by the clearance, color and electric properties such as a dielectric constant of a subject to be measured.

It should be noted that other noncontacting sensor other than the ultrasonic sensor (distance measuring sensor) 9 can be used. For example, a pyroelectric infrared sensor (a sensor for detecting an infrared ray from the human body) can be used. However, optical sensors often cause the measurement errors due to the color differences.

The measurement theory of the ultrasonic sensor 9 uses a pulse echo method. The pulse echo method is that the ultrasonic wave is pulse-modulated and transmitted and that the distance of the subject to be measured is determined from the delay time of the wave returned after reflected by the subject to be measured.

Next the operation of the second embodiment will be described.

The electrostatic capacity sensor alone can detect the seated posture of the passenger and the passenger's physique. However, when the passenger bends forward on the seat, the detection accuracy is lowered.

Therefore, the output circuit of the ultrasonic sensor 9 is provided with the electrostatic capacity sensor, so that is can accurately detect whether the passenger is seated in the case that the electrostatic capacity sensor hardly detects. Further, it can also detect where the passenger is seated and what the physique the passenger has.

Next, the apparatus f or detecting seated condition according to the third embodiment of the present invention will be described.

Figure 6:
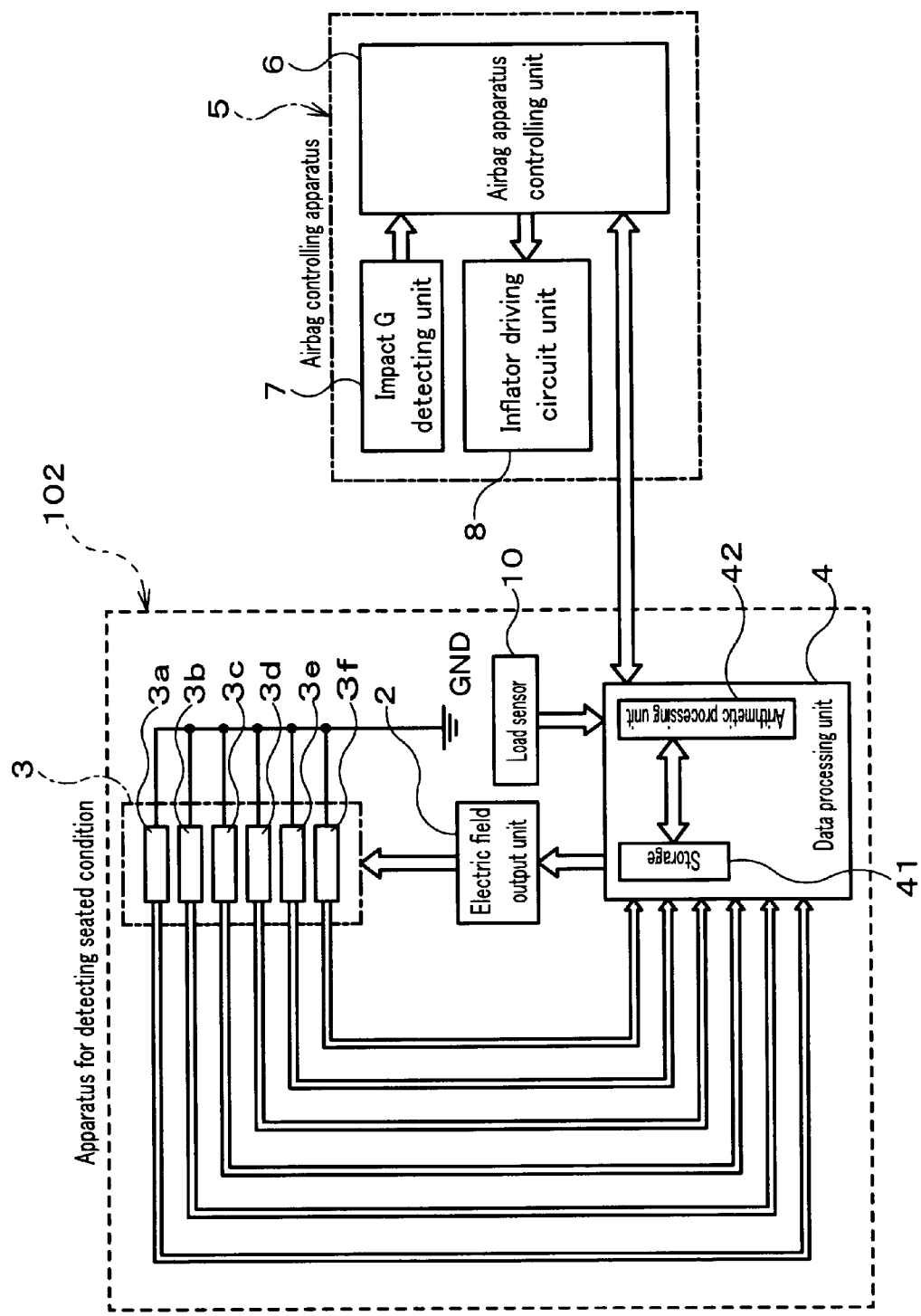
FIG. 6 is a block diagram showing the apparatus for detecting seated condition according to the third embodiment of the present invention used together with the airbag controlling apparatus.
Figure 7:
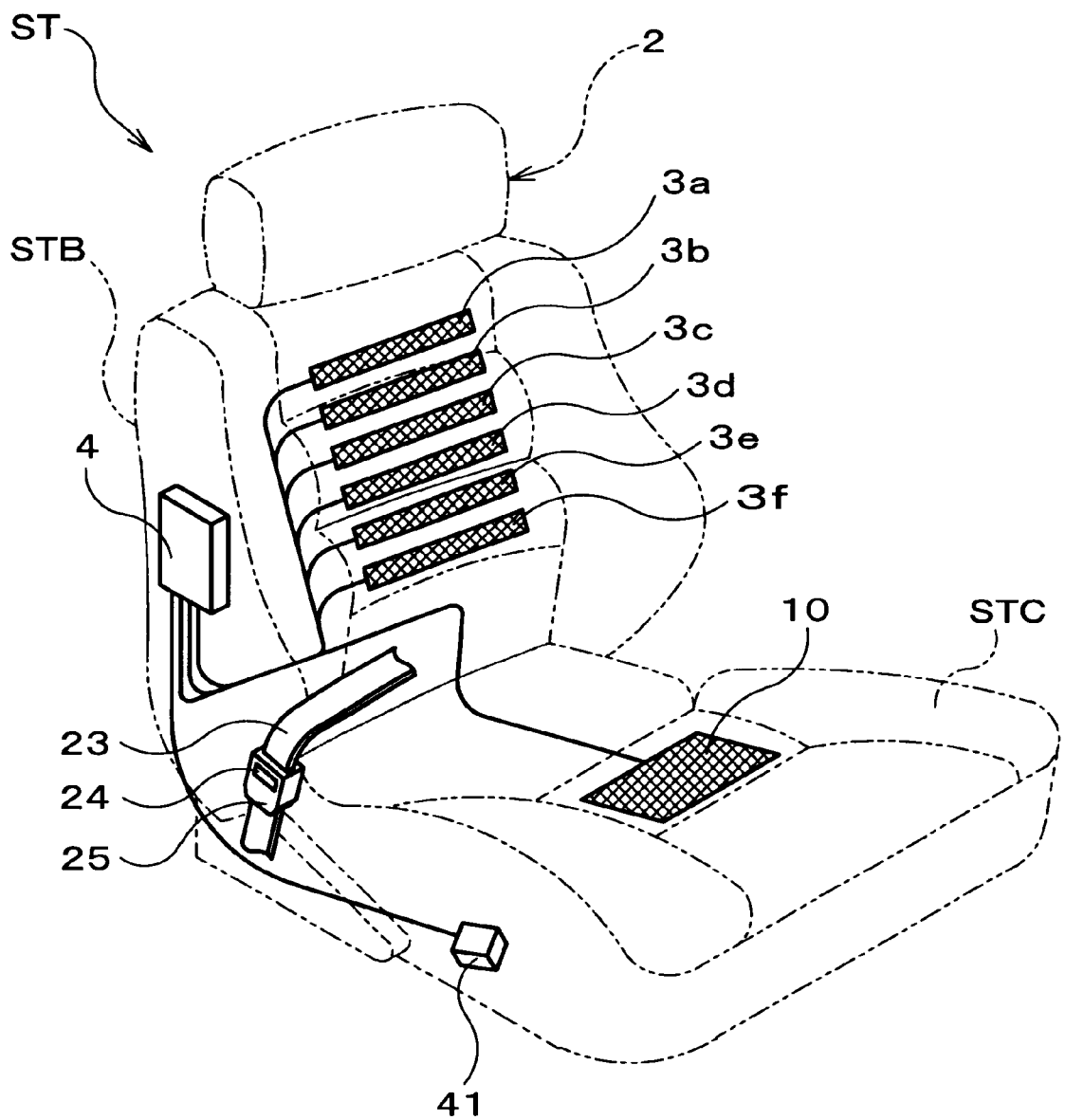
FIG. 7 is a perspective view showing the apparatus for detecting seated condition of the third embodiment of the present invention utilized in a seat of an automobile.

FIG. 6 shows a seat detecting apparatus of the third embodiment used together with the airbag controlling apparatus 5. The apparatus for detecting seated condition 102 comprises a load sensor 10 used together with the electrostatic capacity sensor. As shown in FIG. 7, the load sensor 10 is provided in the inside of the seat cushion STC to detect the load acting on the seat cushion STC.

In this case, the seated condition of the passenger is determined by the data processing unit 4 on the basis of the detected value of the electrostatic capacity sensor and the detected value of the load sensor 10.

In the same way as in the first embodiment, as shown in FIG. 3B, in the case that the passenger who is a dielectric does not present against six electric fields existing between each of the antenna electrodes 3a–3f and the ground GND, the current value measured by the data processing unit 4 becomes an initial current Ib set by the current monitor resistor 2b. On the other hand, in the case that the passenger presents against the electric fields, the current for generating a radio wave flows to the data processing unit 4. The current value becomes a current Ia larger than the initial current Ib.

The current Ia varies depending on the locations of the antenna electrodes 3a–3f. The current Ia becomes large in proportion to the decrease of the distance between the passenger and the antenna electrode 3a–3f while it becomes small in inverse proportion to the increase of the distance between them.

Accordingly, when the antenna electrodes 3a–3f are provided at the head, neck, the shoulders, the back and between each of them and the patterns of the current Ia to the data processing unit 4 is detected, the seated condition of the passenger, e.g., his posture and his sitting height can accurately be obtained at high speed.

In the present embodiment, the seated condition is accurately determined by comparing six detected currents Ia with the parameters of the premeasured currents (table) for kinds of seated conditions of the passengers, and comparing the center of gravity calculated based on the output value of the load sensor 10 and the load distribution with the parameters of the premeasured weights and the center of gravity (table) for kinds of seated conditions of the passengers.

In particular, the above tables are stored in the storage 41 of the data processing unit 4, and the program for calculating the load distribution and the center of gravity is stored in the arithmetic processing unit 42 of the data processing apparatus 4. After the center of gravity is calculated, the table is searched with the measured current Ia, the output value of the load sensor 10 and the center of gravity. Then, the command corresponding to the searched result is applied to, the airbag apparatus controlling unit 6 so that the passenger is protected. The arithmetic processing unit 42 processes the following determinations.

The arithmetic processing unit 42 determines that the seat is empty when the output of the load sensor 10 is zero or smaller than a predetermined value (for example, under 10 kg) and the measured currents Ia are equal to the initial currents Ib.

Further, the arithmetic processing unit 42 determines that a child seat is set when the output of the load sensor 10 is equal to the output value in the case of the child seat set on the seat and the center of gravity is at the center of the seat. On the other hand, the arithmetic processing unit 42 determines that a child is seated on the child seat when the output of the load sensor 10 is within the range from the output value in the case of only the child seat set to the output value in the case of the average-weighed child seated on the child seat and when the center of gravity is at the center of the seat.

Furthermore, the arithmetic processing unit 42 determines that a child or a rather small adult is seated when the measured current values Ia correspond to the child or the rather small adult and when the center of gravity is a t the center of the seat or the back of the center of the seat. Thereafter, the arithmetic processing unit 42 determines whether the passenger is a child or a rather small adult based on the output value of the load sensor 10.

Furthermore, the arithmetic processing unit 42 determines that the passenger is adult when the measured currents Ia correspond to the adult and the output value of the load sensor 10 corresponds to the adult. On the other hand, the arithmetic processing unit 42 determines that the baggage or the child seat is placed on the seat when the output of the load sensor 10 exceeds the predetermined value and the measured- values Ia are equal to the initial values I.b.

After the determination is completed, the arithmetic processing unit 42 searches the table with the center of gravity against the center of the seat and if the center of gravity is at the front of the seat, it determines that the passenger bends forward.

In result of searching the table, when the seated condition for the seat corresponds to empty or the setting of the child seat, the arithmetic processing unit 42 loads the command of not inflating the airbag from the searching table and outputs it to the airbag apparatus controlling unit 6. Further, when the center of gravity is at the front and the passenger bends forward, the unit 42 loads the command of not inflating airbag or the command of de powering from the searching table and outputs it to the airbag apparatus controlling unit 6. In the cases of the other seated conditions, the unit 42 loads the command of inflating the airbag from the searching table and outputs it to the airbag apparatus controlling unit 6.

It should be noted that when other commands are set in the searching table for safety purpose or when the interruption command for safety is received, the arithmetic processing unit 42 outputs this command before all others to the airbag apparatus controlling unit 6.

Next, the operation of the safety apparatus of the automobile utilizing the apparatus for detecting seated condition and the airbag controlling apparatus will be described.

First, as an ignition switch (not shown) is switched to ON or ACC from OFF, the impact G detecting unit 7, the inflator driving circuit unit 8, the data processing apparatus 4 and the electric field output unit 2 drive.

Thereafter, the airbag apparatus controlling unit 6 monitors all the time whether the detected signal of the impact G detecting unit 7 exceeds the predetermined value and searches the searching table (not shown) with each detected value Ia all the time.

When the airbag apparatus controlling unit 6 determines that the condition is in the airbag not-inflating condition based on the result of searching table and when the output of the impact G detecting unit 7 exceeds the predetermined value, the signal of not inflating the airbag is applied to the inflator (not shown) provided in the side airbag apparatus (not shown) and the inflation of the airbag is prohibited (non inflation control).

When the airbag apparatus controlling unit 6 determines that the center of gravity is at the front of the center of the seat and that the passenger bends forward, the above-described non inflation control or a control of inflating the airbag under the condition that the output level of the airbag is set lower is alternatively selected (depowering control). In other cases, it is controlled to the inflation of the airbag at the normal output to protect the passenger (inflator operating control).

In the above-described embodiments, the data processing apparatus 4 detects the outputs of the electric fields; however, the outputs of the electric fields can be detected at the sides of the body of the automobile and the antenna electrodes 11.

Further, in the above-described embodiments, the load sensor 10 is provided in the seat cushion and the antenna electrodes 3a–3f are provided in the back STB; however, the load sensor 10 may be provided in the back STB and the antenna electrodes 3a–3f are provided in the seat cushion from the front to the back.

Furthermore, a load sensor may be provided at a buckle 25 or a tongue 24 of a seat belt 23 as shown in FIG. 7 to detect whether the passenger is seated, whether the child seat is set and whether a child is seated on the child seat.

Furthermore, the apparatus for detecting seated condition can be applied to the seats in the movie theater and the opera theater. In case of emergency, the direction to the exits can be determined from the outputs of the apparatus for detecting seated condition for every audience.

Further, the apparatus for detecting seated condition can be used in the seats in the airplane. In this case, the seat belt fastened condition for all passengers can be confirmed.

While the invention has been shown and described with reference to the illustrated embodiment, it should be understood that various changes in form and details may be made without departing from the scope of the invention which is defined in the appended claims.

What is claimed is:

1. An apparatus for detecting seated condition comprising:

an antenna electrode provided in the inside a seat;

a power supply for supplying power for generating radio wave to said antenna electrode so that an electric field generates between said antenna electrode and a ground to detect a passenger on said seat;

a detecting unit for detecting electrostatic capacity existing between said antenna electrode and said ground; and a data processing unit for determining said seated condition for said seat based on said detected electrostatic capacity;

said detecting unit detecting a first value of said electrostatic capacity in a case that a passenger is not seated and a second value of said electrostatic capacity in a case that a passenger is seated;

said data processing unit correcting said second value of said electrostatic capacity based on said first value.

2. An apparatus for detecting seated condition according to claim 1 further comprising a noncontacting sensor for detecting said passenger on said seat without contacting said passenger; and said seated condition being determined from at least one of said detected value of said electrostatic capacity and a detected value of said noncontacting sensor.

3. An apparatus for detecting seated condition according to claim 1 further comprising a load sensor for detecting a load acting on said seat; and said data processing unit determining said seated condition of said passenger from one of said detected value of said electrostatic capacity and a detected value of said load sensor.

4. An apparatus for detecting seated condition according to claim 1, wherein said electrostatic capacity is premeasured for kinds of the seated posture and kinds of the passenger's physique, and said premeasured data are stored in said data processing unit as parameters, and said data processing unit determines said seated condition of said passenger by comparing said detected value of said electrostatic capacity with said parameters.

5. An apparatus for detecting seated condition comprising:

an antenna electrode provided inside a seat;

a power supply for supplying power for generating radio wave to said antenna electrode so that an electric field generates between said antenna electrode and a ground to detect said passenger on said seat;

a detecting unit for detecting electrostatic capacity existing between said antenna electrode and said ground;

a data processing unit for determining said seated condition for said seat based on said detected electrostatic capacity; and a load sensor for detecting a load acting on said seat;

said data processing unit determining said seated condition for said seat based on said detected value of said electrostatic capacity and a detected value of said load sensor;

said electrostatic capacity, the weight and the center of gravity of the load detected by said load a sensor being premeasured for kinds of the seated posture, kinds of the passenger's physique and kinds of loads;

said premeasured data being stored in said data processing unit as parameters;

said data processing unit determining said seated condition for said seat by comparing said detected value of said electrostatic capacity and said detected value of said load sensor with said parameters.

6. An apparatus for detecting seated condition according to claim 1, wherein said antenna electrode is provided in plural locations of the inside of the back portion of said seat.

7. An apparatus for detecting seated condition according to claim 1, wherein said antenna electrode is provided in the inside of the seat cushion of said seat.

8. An apparatus for detecting seated condition according to claim 5, wherein said load sensor is provided in the inside of the seat cushion of said seat.

9. An apparatus for detecting seated condition according to claim 5, wherein said load sensor is provided in the inside of the back portion of said seat.

* * * * *